United States Patent
Chen (10) Patent No.: US 11,675,146 B2
(45) Date of Patent: Jun. 13, 2023

(54) OPTICAL ASSEMBLY AND MANUFACTURING METHOD THEREOF

(71) Applicant: InnoLight Technology (Suzhou) LTD., Jiangsu (CN)

(72) Inventor: Long Chen, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 0 days.

(21) Appl. No.: 17/468,748

(22) Filed: Sep. 8, 2021

(65) Prior Publication Data

US 2021/0405310 A1    Dec. 30, 2021

Related U.S. Application Data

(63) Continuation of application No. 16/736,989, filed on Jan. 8, 2020, now Pat. No. 11,137,557.

(30) Foreign Application Priority Data

Jan. 17, 2019   (CN) .......................... 201910042389.9

(51) Int. Cl.
*G02B 6/42* (2006.01)
*H04B 10/25* (2013.01)
*H04J 14/02* (2006.01)

(52) U.S. Cl.
CPC ......... *G02B 6/4239* (2013.01); *G02B 6/4206* (2013.01); *G02B 6/4244* (2013.01); *H04B 10/25891* (2020.05); *H04J 14/02* (2013.01)

(58) Field of Classification Search
None
See application file for complete search history.

(56) References Cited

U.S. PATENT DOCUMENTS

| 6,120,191 A * | 9/2000 | Asakura ............... G02B 6/4206 |
|---|---|---|
| | | 385/33 |
| 2001/0038656 A1 | 11/2001 | Takeuchi et al. |
| 2003/0011899 A1 | 1/2003 | Bourcier et al. |

(Continued)

FOREIGN PATENT DOCUMENTS

| CN | 101346646 A | 4/2011 |
|---|---|---|
| CN | 104677992 A | 6/2015 |

(Continued)

*Primary Examiner* — Jerry Rahll
(74) *Attorney, Agent, or Firm* — Finnegan, Henderson, Farabow, Garrett & Dunner, LLP (57) ABSTRACT

An optical assembly includes a base plate, a light transmitting component arranged on the base plate, a lens component arranged on the base plate along an optical path of light transmitted from the light transmitting component, a supporting member, and an auxiliary member. The supporting member includes a bottom surface that bonds to the base plate and a side surface that connects to the auxiliary member. The auxiliary member includes a side surface on which the lens component is disposed and a bonding surface that bonds to the side surface of the supporting member. The lens component is configured to focus and couple, or collimate, an optical signal transmitted from the light transmitting component. A bottom surface of the auxiliary member and a bottom surface of the lens component are both higher than the top surface of the base plate.

13 Claims, 4 Drawing Sheets

(56) References Cited

U.S. PATENT DOCUMENTS

| | | | | |
|---|---|---|---|---|
| 2004/0027631 A1* | 2/2004 | Nagano | ............... | G02B 6/4249 |
| | | | | 372/36 |
| 2004/0114648 A1* | 6/2004 | Nagano | ................. | H01S 5/405 |
| | | | | 372/36 |
| 2005/0121687 A1* | 6/2005 | Yamada | .............. | G02B 6/4201 |
| | | | | 257/98 |
| 2006/0222042 A1 | 10/2006 | Teramura et al. | | |
| 2011/0122514 A1* | 5/2011 | Kano | ................. | G11B 7/1374 |
| | | | | 359/811 |
| 2015/0380896 A1 | 12/2015 | Kimura et al. | | |

FOREIGN PATENT DOCUMENTS

| | | |
|---|---|---|
| CN | 105027368 A | 11/2015 |
| CN | 106772891 A | 5/2017 |

* cited by examiner

OPTICAL ASSEMBLY AND MANUFACTURING METHOD THEREOF

CROSS-REFERENCE TO RELATED APPLICATION

This application is a continuation of application Ser. No. 16/736,989, filed Jan. 8, 2020 (allowed), which is based upon and claims priority to Chinese Patent Application No. 201910042389.9, filed on Jan. 17, 2019, the entire content of all of which are incorporated herein by reference.

FIELD OF THE DISCLOSURE

The present disclosure relates to the field of optical communication technology and, more particularly, to an optical assembly including a lens component and a manufacturing method thereof.

BACKGROUND

In the field of optical communications, especially in optical modules, lens components are necessary for focusing, coupling, or collimating optical signals. Conventional technology of coupling for a high-magnifying-power lens or collimation for a collimating lens is typically applied in a scenario where a thermal electric cooler (TEC) is used as a temperature control platform. It is typical to place all of a semiconductor laser, a high-magnifying-power lens or a collimating lens, and a receiver assembly (PIC, PLC, optical fiber, or another optical waveguide apparatus) on the TEC and in a hermetic package. Epoxy resin used for securing the high-magnifying-power lens or the collimating lens has a relatively high coefficient of thermal expansion and is relatively sensitive to erosion by humidity in the environment. Therefore, temperature changes or humidity absorption can result in significant deviation in the position of the lens from its ideal position. This will cause functional deterioration or failure of the entire apparatus.

Additionally, in a small package, the size of the lens is relatively small, and the cutting of the side during mass production (if a silicon lens or a batch molded lens is used) may lead to a problematic angle of the side of the lens, which makes the lens difficult to be manipulated with a gripping device during assembly.

SUMMARY

Purposes of the present disclosure include providing a highly reliable optical assembly that has an easy-to-assemble lens assembly and can be used in a non-hermetic package.

To achieve one aspect of the aforementioned purpose, one embodiment of the present disclosure provides an optical assembly including a base plate, a light transmitting component arranged on the base plate, a lens component arranged on the base plate along an optical path of light transmitted from the light transmitting component, a supporting member, and an auxiliary member. The supporting member includes a bottom surface that bonds to the base plate and a side surface that connects to the auxiliary member. The auxiliary member includes a side surface on which the lens component is disposed and a bonding surface that bonds to the side surface of the supporting member. The lens component is configured to focus and couple, or collimate, an optical signal transmitted from the light transmitting component. A bottom surface of the auxiliary member and a bottom surface of the lens component are both higher than a top surface of the base plate.

Another embodiment of the present disclosure provides a manufacturing method of an optical assembly. The method includes the following steps: providing a base plate; installing a light transmitting component on the base plate; placing a lens component connected to an auxiliary member on an optical path of light transmitted from the light transmitting component; turning on the light transmitting component to output an optical signal, and adjusting the position of the auxiliary member so that the lens component is in its optimal coupling position or optimal collimating position; and securing the auxiliary member onto the base plate by means of a supporting member while preserving the relative positions of the auxiliary member and the light transmitting component.

Still another embodiment of the present disclosure provides another manufacturing method of an optical assembly. The method includes the following steps: providing a base plate; installing a light transmitting component on the base plate; placing a supporting member on the base plate, and placing a lens component connected to an auxiliary member on an optical path of light transmitted from the light transmitting component, so that the auxiliary member is connected to the supporting member; applying a bonding agent between the auxiliary member and supporting member; turning on the light transmitting component to output an optical signal, and adjusting the positions of the auxiliary member and supporting member so that the lens component is in its optimal coupling position or optimal collimating position; applying a bonding agent between the supporting member and the base plate; and curing the bonding agent between the auxiliary member and the supporting member and between the supporting member and the base plate.

DETAILED DESCRIPTION

The text below provides a detailed description of the present disclosure with reference to specific embodiments illustrated in the attached drawings. However, these embodiments do not limit the present disclosure. The scope of protection for the present disclosure covers changes made to the structure, method, or function by persons having ordinary skill in the art on the basis of these embodiments.

In order to facilitate the presentation of the drawings in the present disclosure, the sizes of certain structures or portions have been enlarged relative to other structures or portions. Therefore, the drawings in the present disclosure are only for the purpose of illustrating the basic structure of the subject matter of the present disclosure.

Additionally, terms in the text indicating relative spatial position, such as "upper," "above," "lower," "below," or x-, y-, or z-axis, and so forth, are used for explanatory purposes in describing the relationship between a unit or feature depicted in a drawing with another unit or feature therein. Terms indicating relative spatial position may refer to positions other than those depicted in the drawings when a device is being used or operated. For example, if a device shown in a drawing is flipped over, a unit which is described as being positioned "below" or "under" another unit or feature will be located "above" the other unit or feature. Therefore, the illustrative term "below" may include positions both above and below. A device may be oriented in other ways (rotated 90 degrees or facing another direction), and descriptive terms that appear in the text and are related to space should be interpreted accordingly. When a component or layer is said to be "above" another part or layer or "connected to" another part or layer, it may be directly above the other part or layer or directly connected to the other part or layer, or there may be an intermediate component or layer.

Figure 1:
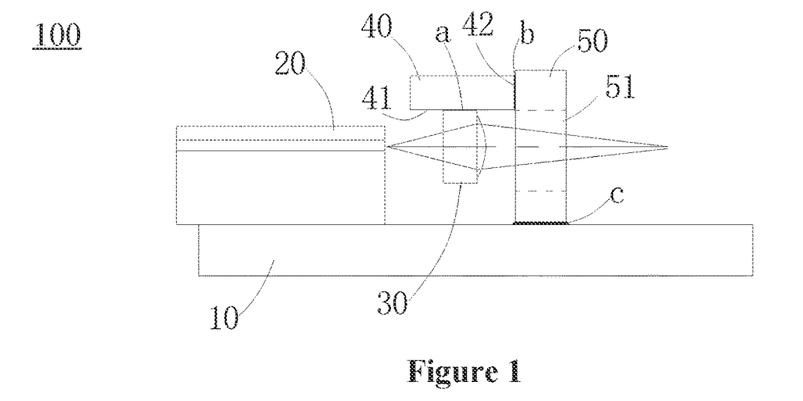
FIG. 1 is a side view of a structural diagram of an optical assembly.

FIG. 1 is a side view of a structural diagram of an optical assembly 100. As shown in FIG. 1, the optical assembly 100 includes a base plate 10 and a light transmitting component 20 and a lens component 30 that are arranged on the base plate 10 along an optical path. The optical assembly 100 further includes a supporting member 50 and an auxiliary member 40 that are used for securing the lens component 30. Here, the supporting member 50 includes a bottom surface that connects to the base plate 10 and a side surface that connects to the auxiliary member 40. The auxiliary member 40 includes a side surface 41 on which the lens component 30 is disposed and a bonding surface 42 that connects to the side surface of the supporting member 50. The side surface 41 of the auxiliary member 40 connects to the lens component 30, and the bonding surface 42 bonds to the side surface of the supporting member 50, so that the lens component 30 focuses and couples, or collimates, an optical signal transmitted from the light transmitting component 20. The bottom surface of the supporting member 50 bonds to the base plate 10, so that a bottom surface of the auxiliary member 40 and a bottom surface of the lens component 30 are both higher than the top surface of the base plate 10.

During assembly, the lens component 30 and the auxiliary member 40 are bonded and secured together in advance, and, when bonding, the thickness of a glue layer a between the lens component 30 and the auxiliary member 40 is ensured to be small enough, which in general can be ensured to be less than 15 μm or even less than 10 μm. Alternatively, the lens component 30 and the auxiliary member 40 may also be connected by other means such as welding. Still alternatively, the lens component 30 and the auxiliary member 40 may be formed in an integrated one-piece structure. Then, the supporting member 50 and the lens component 30 that is bonded to the auxiliary member 40 are placed on an optical path of the light transmitting component 20. Once the position of the lens component 30 has been adjusted, glue is dispensed between the bonding surface 42 of the auxiliary member 40 and the side surface of the supporting member 50 and between the bottom surface of the supporting member 50 and the base plate 10 to form glue layers b and c. The glue layers b and c are compressed to be less than 15 μm or less than 10 μm in thickness. At the same time, an ultraviolet light is turned on to cure the glue at the two aforementioned places. The addition of the auxiliary member 40 that is secured to or formed as a one-piece structure with the lens component 30 facilitates the adjustment of the position of the lens component 30 during assembly by manipulating the auxiliary member 40, thus addressing the difficulty in the manipulation of the lens component 30 using a gripping device or a suction nozzle due to the small size of the lens component 30 or roughness in the cutting of the side of the lens component 30. The lens component 30 does not need to come into contact with the base plate 10, thus avoiding problems caused by the unevenness in the thickness of the glue at the bottom of the lens component 30 when gluing the bottom of the lens component 30 to the base plate 10, which may have resulted from the cutting angle. Meanwhile, the adjustment of the positions of the supporting member 50 and the auxiliary member 40 in coordination allows the adjustment of the position of the lens component 30 in three dimensions, thus realizing precise coupling or collimating. In addition, the ease to control the thickness of the glue layers a, b, and c in each connecting area within a small range prevents the deviation in the position of the lens component 30 caused by temperature changes or humidity absorption when the glue layer is too thick.

First Example Embodiment

Figure 2:
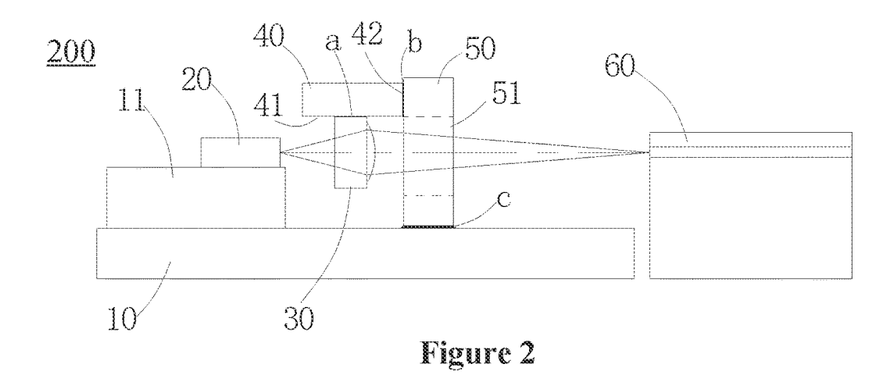
FIG. 2 is a side view of a structural diagram of an optical assembly according to a first example embodiment.

FIG. 2 is a side view of a structural diagram of an optical assembly 200 according to a first example embodiment. In the first example embodiment illustrated in FIG. 2, the optical assembly 200 includes a light transmitting end. The light transmitting end includes a light transmitting component 20, which is a semiconductor laser, a lens component 30, and an optical waveguide 60. Here, the semiconductor laser is secured onto the base plate 10 by means of a small base plate 11. The lens component 30 is installed on the base plate 10 by means of the aforementioned auxiliary member 40 and supporting member 50. The lens component 30 here is a coupling lens, which may be a high-magnifying-power spherical lens or an aspherical lens. An optical signal transmitted from the semiconductor laser is coupled to the optical waveguide 60 by the lens component 30. The aforementioned optical waveguide 60 may also be an optical integrated chip, an optical fiber, or another medium that transmits optical signals. Here, the base plate 10 may be a surface of a package housing, a heat sink, or another flat plate such as a thermal electric cooler (TEC) or a thermally conductive metal. One or more other optical components, such as a wavelength division multiplexer or demultiplexer, an optical isolator, or a polarizing beam splitting component, may be added onto the optical path between the lens component 30 and the optical waveguide 60, which is also within the scope of protection of the present disclosure.

In this example embodiment, a side surface 41 of the auxiliary member 40, on which the lens component 30 is disposed, faces the base plate 10. The lens component 30 is located below the auxiliary member 40. A bonding surface 42 of the auxiliary member 40 is perpendicular to the side surface 41, and the auxiliary member 40 is bonded to a side surface of the supporting member 50 by means of the bonding surface 42, the side surface being located on the optical path. The supporting member 50 is located on the optical path after the semiconductor laser and the lens component 30. A light passing surface or light passing hole 51 on the optical path is arranged on the side surface of the supporting member 50. The area of the supporting member 50 that is bonded to the auxiliary member 40 is above the light passing surface or light passing hole 51. The supporting member 50 may also be a transparent block such as a glass block or a transparent plate, or another block or vertical plate with a light passing hole. An optical signal transmitted from the semiconductor laser is focused by the lens component 30 and then goes through the light passing surface or light passing hole 51 of the supporting member 50 before converging into the optical waveguide 60. During assembly, the semiconductor laser and the optical waveguide 60 are installed first. Then the supporting member 50 and the lens component 30 that is bonded to the auxiliary member 40 in advance are placed on the optical path between the semiconductor laser and the optical waveguide 60. The lens component 30 is adjusted to its optimal coupling position by means of manipulating the auxiliary member 40 with a gripping device or a suction nozzle, so that the optical signal transmitted from the semiconductor laser is coupled to the optical waveguide 60 to the maximum extent. Finally, glue is dispensed between the bonding surface 42 of the auxiliary member 40 and the side surface of the supporting member 50 and between a bottom surface of the supporting member 50 and the base plate 10. Both of the glue layer b between the bonding surface 42 of the auxiliary member 40 and the side surface of the supporting member 50 and the glue layer c between a bottom surface of the supporting member 50 and the base plate 10 are compressed to be less than 15 μm or less than 10 μm in thickness. At the same time, an ultraviolet light is turned on to cure the glue at the glue layers b and c.

A manufacturing method of the optical assembly 200 includes the following steps:
providing the base plate 10;
installing the light transmitting component 20, which is the semiconductor laser, and the small base plate 11 on the base plate 10, and, at the same time, installing the optical waveguide 60;
placing the lens component 30 connected to the auxiliary member 40 on an optical path of light transmitted from the semiconductor laser 20;
turning on the semiconductor laser 20 to output an optical signal, and adjusting the position of the auxiliary member 40 so that the lens component 30 is in its optimal coupling position; and
securing the auxiliary member 40 onto the base plate 10 by means of the supporting member 50 while preserving the relative positions of the auxiliary member 40 and the light transmitting component 20.

The aforementioned lens component 30 and auxiliary member 40 may be formed as a one-piece structure. Alternatively, the lens component 30 and the auxiliary member 40 may be glued or welded together in advance. The aforementioned method for securing the auxiliary member 40 onto the base plate 10 by means of a supporting member 50 is as follows: dispensing ultraviolet glue between the auxiliary member 40 and the supporting member 50 and between the supporting member 50 and the base plate 10; applying pressure to the supporting member 50 so that the glue layer b between the auxiliary member 40 and the supporting member 50 and the glue layer c between the supporting member 50 and the base plate 10 are both less than 15 μm or even less than 10 μm in thickness; and then irradiating ultraviolet light on the ultraviolet glue at the glue layers b and c for curing. Here, the ultraviolet glue may be substituted with another bonding agent, which is also within the scope of protection of the present disclosure.

When the aforementioned supporting member 50 is arranged on the optical path and, instead of having a light passing hole, the supporting member 50 has a transparent light passing surface or has an optical component, such as an optical isolator, a polarization component, a spectroscopic component, a wave plate, or an optical filter, added to the place where light passes through, the optical propagation path will be affected if the placement of the supporting member 50 occurs after the adjustment of the position of the lens component 30. Therefore, in this scenario, the supporting member 50 and the auxiliary member 40 need to be placed on the optical path together and adjusted and tested together. Specifically, this can be done using another manufacturing method of the optical assembly 200, which includes the following steps:
providing the base plate 10;
installing the light transmitting component 20 on the base plate 10;
placing the supporting member 50 on the base plate 10, and placing the lens component 30 connected to the auxiliary member 40 on an optical path of light transmitted from the light transmitting component 20, so that the auxiliary member 40 is connected to the supporting member 50;
applying a bonding agent between the auxiliary member 40 and the supporting member 50;
turning on the light transmitting component 20 to output an optical signal, and adjusting the positions of the auxiliary member 40 and the supporting member 50 so that the lens component 30 is in its optimal coupling position or optimal collimating position;
applying the bonding agent between the supporting member 50 and the base plate 10; and
curing the bonding agent between the auxiliary member 40 and the supporting member 50 and between the supporting member 50 and the base plate 10.

The aforementioned bonding agent is usually ultraviolet glue, which can be cured by ultraviolet light and enables convenient assembly. The aforementioned ultraviolet glue may be substituted with another bonding agent, which is also within the scope of protection of the present application.

Since the auxiliary member 40 and the supporting member 50 may be made bigger in size, all of the surfaces in areas where glue is applied can be made relatively smooth, thereby ensuring the evenness and thinness of the glue layers between the lens component 30 and the auxiliary member 40, between the auxiliary member 40 and the supporting member 50, and between the supporting member 50 and the base plate 10. Furthermore, the lens component 30 does not come into contact with the base plate 10. This avoids problems caused by any unevenness in the thickness of the glue at the bottom of the lens component 30, which may have resulted from a cutting angle, when gluing the bottom of the lens component 30 to the base plate 10. This also maximally prevents the deviation in position of the lens component 30 caused by temperature changes or humidity absorption when the glue layer is too thick, thereby effectively improving the stability and reliability of the assembly and entire apparatus. The adjustment of the positions of the supporting member 50 and the auxiliary member 40 in coordination allows the adjustment of the position of the lens in three dimensions, thus realizing precise coupling or collimating and improving assembly efficiency.

Second Example Embodiment

Figure 3:
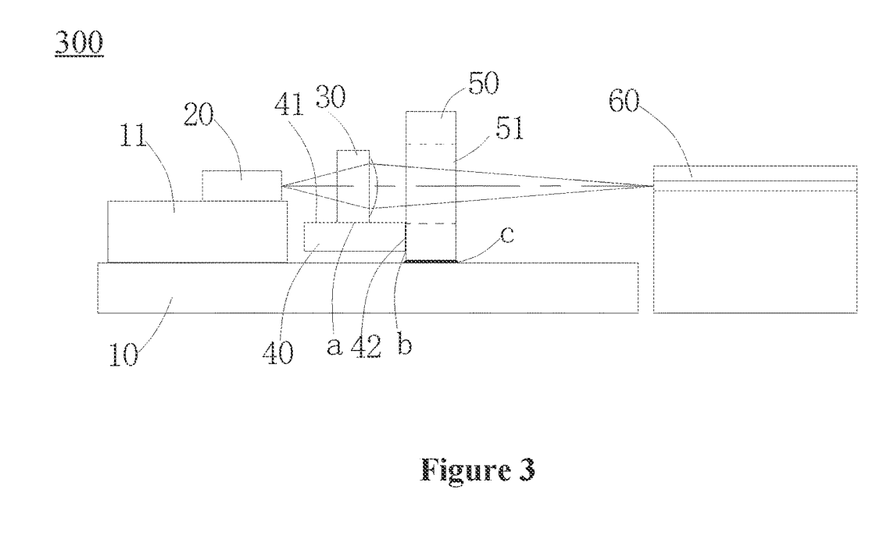
FIG. 3 is a side view of a structural diagram of an optical assembly according to a second example embodiment.

FIG. 3 is a side view of a structural diagram of an optical assembly 300 according to a second example embodiment. In the second example embodiment illustrated in FIG. 3, the optical assembly 300 similarly includes a light transmitting end. The second example embodiment differs from the first example embodiment 1 in that the side surface 41 of the auxiliary member 40, on which the lens component 30 is disposed, faces away from the base plate 10, and the lens component 30 is located above the auxiliary member 40; the area where the supporting member 50 bonds to the auxiliary member 40 is below its light passing surface or light passing hole 51; and all other structures are the same as those in the first example embodiment. During assembly, the auxiliary member 40 needs to be manipulated with a gripping device from either side of the auxiliary member 40 below the lens component 30. Similar to the first example embodiment, the bonding surface 42 of the auxiliary member 40 is bonded and secured to the side surface of the supporting member 50 so that the auxiliary member 40 still does not come into contact with the base plate 10, thus preventing the deviation in position of the lens caused by temperature changes or humidity absorption when the glue layer is too thick.

Third Example Embodiment

Figure 4:
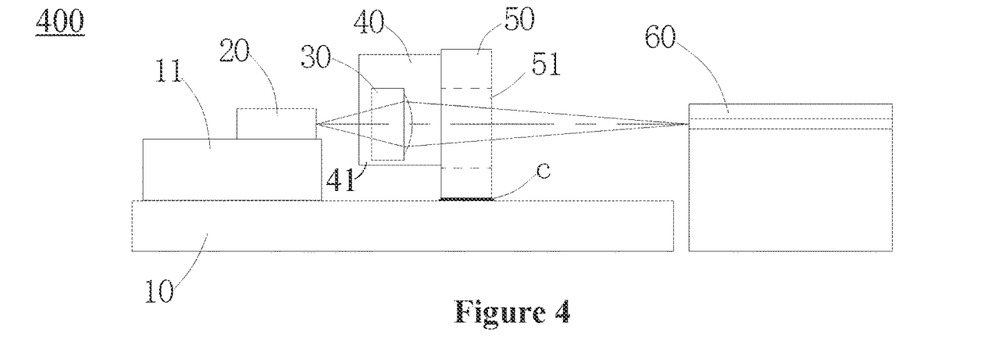
FIG. 4 is a side view of a structural diagram of an optical assembly according to a third example embodiment.
Figure 5:
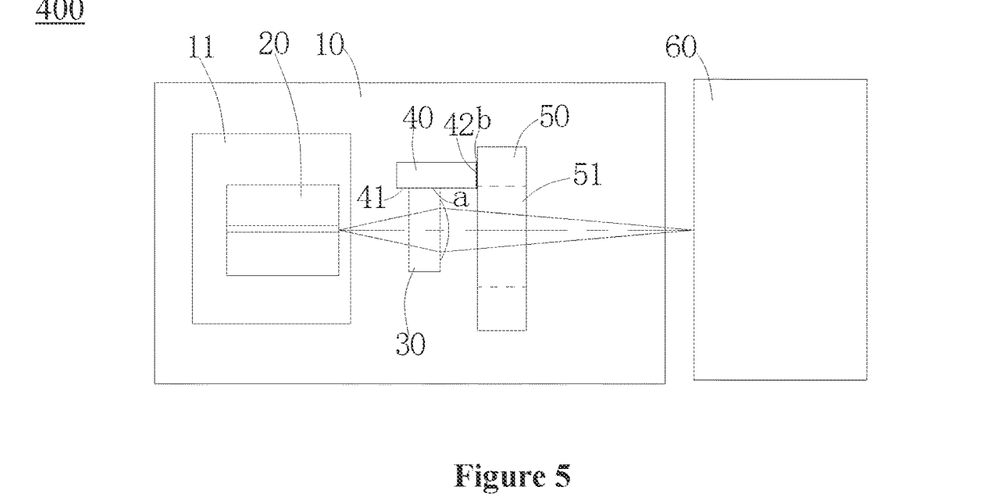
FIG. 5 is a top view of the optical assembly illustrated in FIG. 4, according to an example embodiment.
Figure 6:
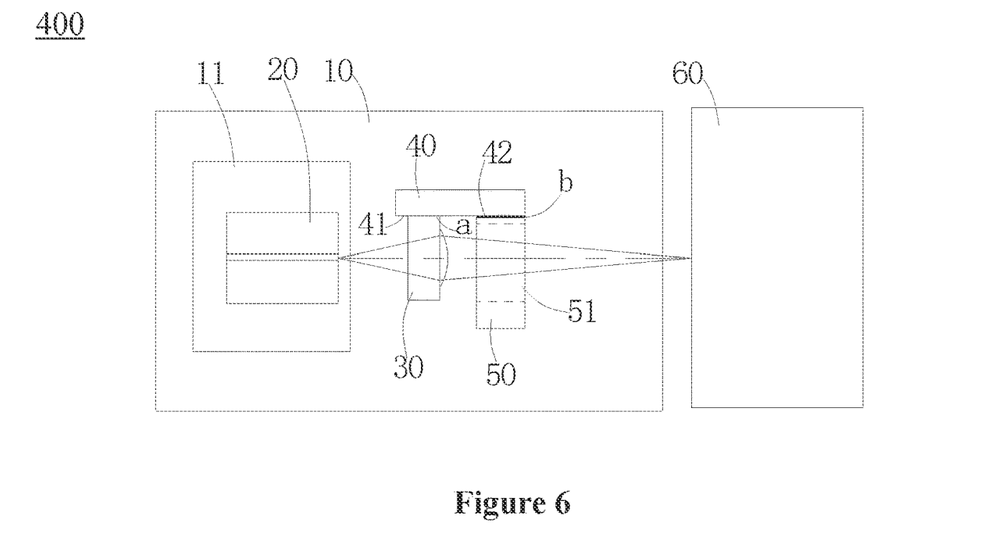
FIG. 6 is a top view of the optical assembly illustrated in FIG. 4, according to another example embodiment.

FIG. 4 is a side view of a structural diagram of an optical assembly 400 according to a third example embodiment. FIG. 5 is a top view of the optical assembly 400 illustrated in FIG. 4, according to an embodiment. FIG. 6 is a top view of the optical assembly 400 illustrated in FIG. 4, according to another embodiment. The third example embodiment, as illustrated in FIG. 4, differs from the first example embodiment in that the side surface 41 of the auxiliary member 40, on which the lens component 30 is disposed, is perpendicular to the base plate 10, and the lens component 30 is located on a side surface of the auxiliary member 40. The bonding between the auxiliary member 40 and the supporting member 50 may be in one of the two ways illustrated in FIG. 5 and FIG. 6.

In one way of bonding, as illustrated in FIG. 5, the bonding surface 42 of the auxiliary member 40 is still perpendicular to its side surface 41 on which the lens component 30 is disposed. The side surface of the supporting member 50 that bonds to the auxiliary member 40 is located on the same plane as the side surface of the supporting member 50 on which the light passing surface or light passing hole 51 is located. The bonding area between the supporting member 50 and the auxiliary member 40 is located to the side of the light passing surface or light passing hole 51. FIG. 5 only shows the bonding area between the auxiliary member 40 and the supporting member 50 being located on one side of the light passing surface or light passing hole 51 of the supporting member 50. The bonding area between the auxiliary member 40 and the supporting member 50 can also be located at the other side of the light passing surface or light passing hole 51. The only requirement is that the lens component 30 and the light passing surface or light passing hole 51 remain on the optical path of an optical signal transmitted from the semiconductor laser.

Another way of bonding, as illustrated in FIG. 6, differs from the way of bonding illustrated in FIG. 5 in that the bonding surface 42 of the auxiliary member 40 is on the same plane as its side surface 41 on which the lens component 30 is disposed, and the side surface of the supporting member 50 that bonds to the auxiliary member 40 is perpendicular to the side surface of the supporting member 50 on which the light passing surface or light passing hole 51 is located. The bonding area between the supporting member 50 and the auxiliary member 40 is located to the side of the side surface 41 of the auxiliary member 40 on which the lens component 30 is disposed.

Fourth Example Embodiment

Figures 7, 8:
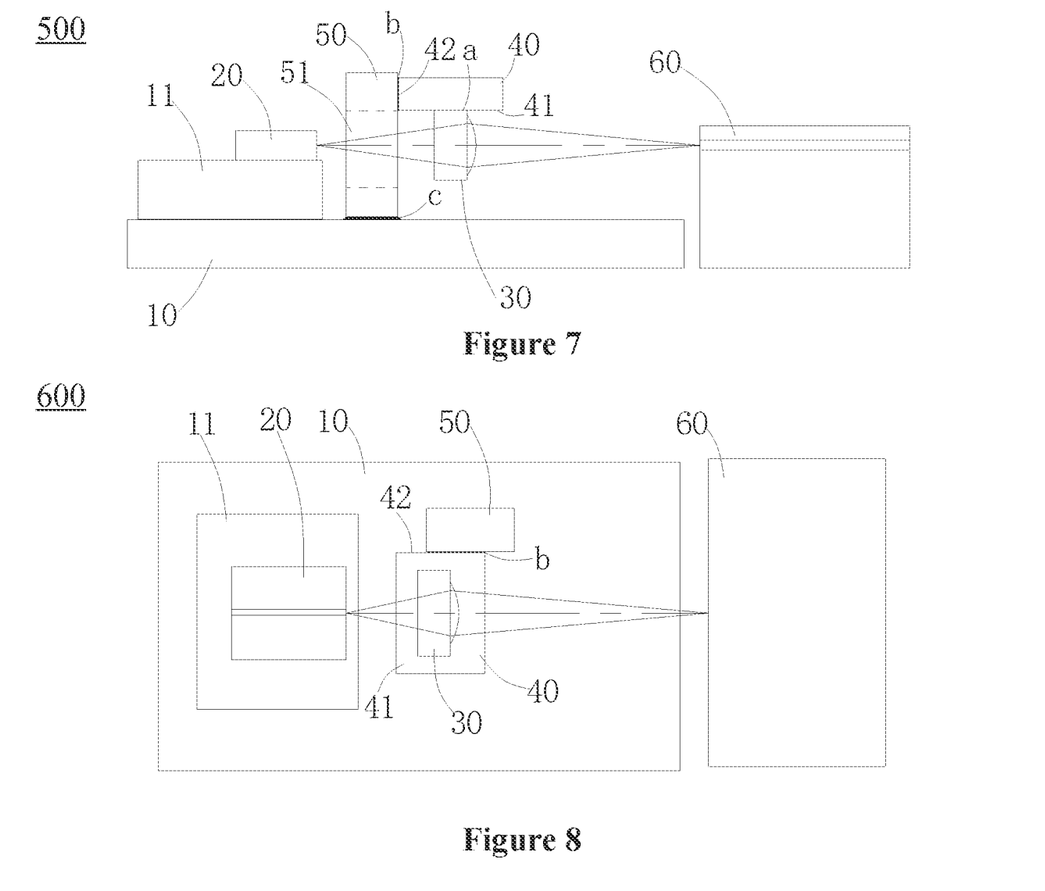
FIG. 7 is a side view of a structural diagram of an optical assembly according to a fourth example embodiment.
FIG. 8 is a top view of a structural diagram of an optical assembly according to a fifth example embodiment.

FIG. 7 is a side view of a structural diagram of an optical assembly 500 according to a fourth example embodiment. The fourth example embodiment, as illustrated in FIG. 7, differs from the first example embodiment in that the supporting member 50 is located on the optical path between the semiconductor laser and the lens component 30. An optical signal transmitted from the semiconductor laser first passes through the light passing surface or light passing hole 51 of the supporting member 50 and is then focused by the lens component 30 before converging into the optical waveguide 60.

Similarly, in the structures of aforementioned second and third example embodiments, the supporting member 50 may also be arranged on the optical path between the semiconductor laser and the lens component 30.

Fifth Example Embodiment

FIG. 8 is a top view of a structural diagram of an optical assembly 600 according to a fifth example embodiment. The fifth example embodiment, as illustrated in FIG. 8, differs from all of the aforementioned example embodiments in that the supporting member 50 is not on the optical path. Rather, the supporting member 50 is arranged on a side surface of the auxiliary member 40. In other words, the auxiliary member 40's bonding surface 42 that bonds to the supporting member 50 is located on a side surface of the auxiliary member 40 that is parallel to and farther away from the optical path. In FIG. 8, the auxiliary member 40's side surface 41 on which the lens component 30 is disposed faces away from the base plate 10. The lens component 30 is located above the auxiliary member 40. The auxiliary member 40's bonding surface 42 is perpendicular to the side surface 41 and is parallel to the optical path. The supporting member 50 is located outside of the optical path. The side surface of the supporting member 50 that bonds to the auxiliary member 40 is also parallel to the optical path and perpendicular to the base plate 10. Similarly, the lens component 30 may also be arranged below the auxiliary member 40 or on another side surface opposite to the bonding surface 42.

Sixth Example Embodiment

Figure 9:
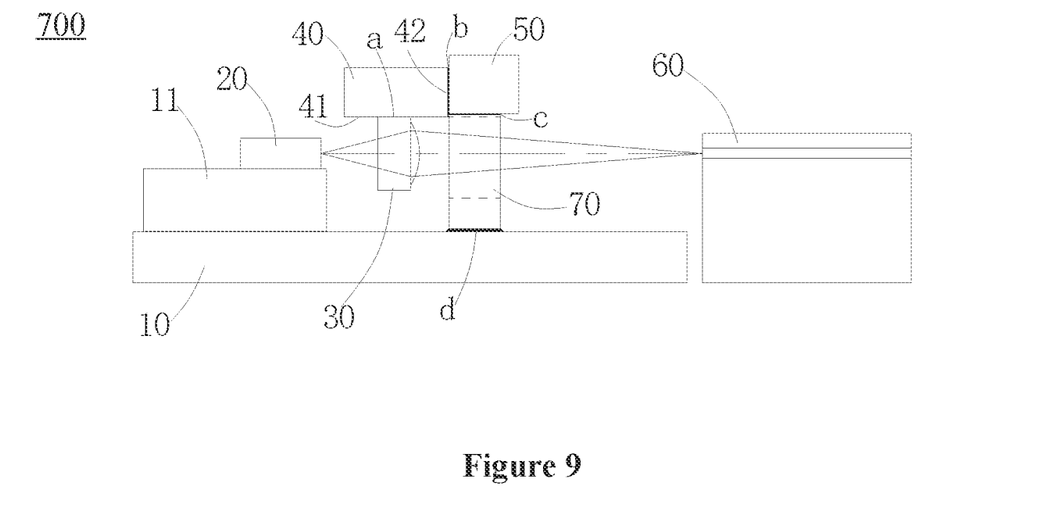
FIG. 9 is a side view of a structural diagram of an optical assembly according to a sixth example embodiment.

FIG. 9 is a side view of a structural diagram of an optical assembly 700 according to a sixth example embodiment. The sixth example embodiment, as illustrated in FIG. 9, differs from the first example embodiment in that an optical isolator 70 is securely installed below the supporting member 50. The optical isolator 70 is located on the optical path, and the supporting member 50 is located above the optical isolator 70 instead of on the optical path. During assembly, first, the semiconductor laser, the optical isolator 70, and the optical waveguide 60 are installed and secured, and a glue layer d between the optical isolator 70 and the base plate 10 is compressed to be less than 15 μm or even less than 10 μm in thickness and is cured. Then the supporting member 50 is placed above the optical isolator 70, and the lens component 30 and the auxiliary member 40 that are secured together in advance or formed as a one-piece structure are placed on the optical path between the semiconductor laser and the optical isolator 70. The lens component 30 is adjusted to its optimal coupling position by means of the auxiliary member 40 so that an optical signal transmitted from the semiconductor laser is coupled to the optical waveguide 60 to the maximum extent. Finally, glue is dispensed between the auxiliary member 40 and the supporting member 50 and between the supporting member 50 and the optical isolator 70, and the glue layer b between the auxiliary member 40 and the supporting member 50 and the glue layer c between the supporting member 50 and the optical isolator 70 are compressed to be less than 15 μm or less than 10 μm in thickness. At the same time, an ultraviolet light is turned on to cure the glue at the glue layers b and c. The addition of the optical isolator 70 on the optical path allows for the isolation of a return light traveling in a backward direction opposite to the direction in which the light transmitted from the semiconductor laser, thus preventing the return light from entering into the semiconductor laser and affecting the stability of the apparatus. Furthermore, the supporting member 50 is placed above the optical isolator 70, effectively reducing the length of the apparatus. Additionally, the optical isolator 70 may be installed and secured into position in advance, making it especially suitable for a multi-channel light transmitting end.

Similarly, the optical isolator 70 may also be placed on the optical path between the semiconductor laser and the lens component 30.

An optical isolator may also be added directly to the light passing surface or light passing hole 51 of the supporting member 50 in the optical assembly in each one of the first through fourth example embodiments described above. This may further reduce the length and height of the apparatus, thus facilitating the realization of a small-size package.

The aforementioned optical isolator 70 may also be substituted with one of the following: a polarization component, a spectroscopic component, an optical filter, etc.

Seventh Example Embodiment

Figure 10:
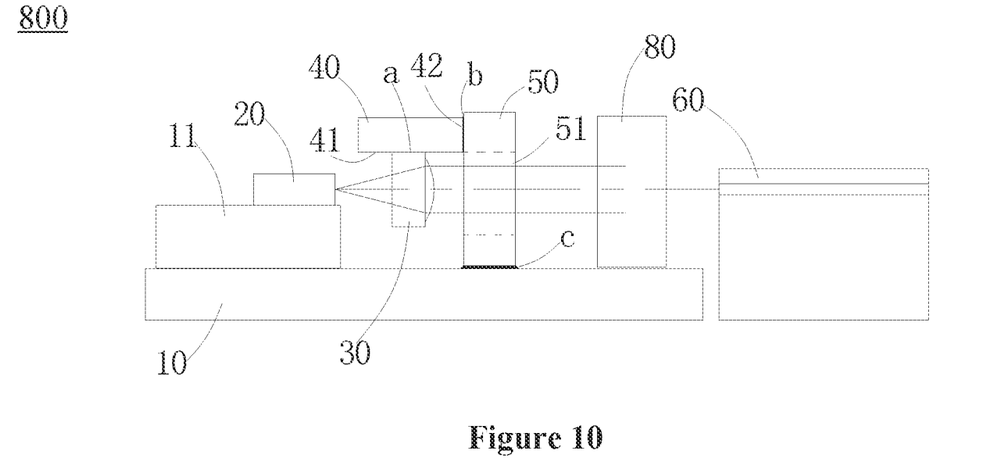
FIG. 10 is a side view of a structural diagram of an optical assembly according to a seventh example embodiment.

FIG. 10 is a side view of a structural diagram of an optical assembly 800 according to a seventh example embodiment. The seventh example embodiment, as illustrated in FIG. 10, differs from all of the aforementioned example embodiments in that the optical assembly 800 further includes one or more of a wavelength division multiplexer 80, a beam shaping component, and an optical path adjustment component, etc., arranged on the optical path after the lens component 30. Here, the lens component 30 is a collimating lens. During installation, the lens component 30 needs to be adjusted to an optimal collimating position to collimate an optical signal transmitted from the semiconductor laser before the optical signal is shaped by the aforementioned wavelength division multiplexer 80, beam shaping component, optical path adjustment component, etc. Then the shaped optical signal enters into the optical waveguide 60.

Similarly, the optical assembly in each of the example embodiments described above may also be a light receiving end, including a light transmitting component such as an optical waveguide or an optical fiber, a lens component, and a light receiving component. Here, the optical waveguide or optical fiber may also be substituted with another component for inputting an optical signal. The optical signal is inputted through the optical waveguide or optical fiber before coupled and focused by a lens component onto the light receiving component. Here, the light receiving component may be an optical detector, another optical integrated chip, etc. Similarly, one or more of a wavelength division demultiplexer, a beam shaping component, an optical path adjustment component, etc., may be arranged between the lens component and the light receiving component to shape the optical path.

Embodiments of the present disclosure provides the following benefits. The design of the auxiliary member that is secured to, or formed as a one-piece structure with, the lens facilitates the adjustment of the position of the lens component during assembly by manipulating the auxiliary member, thus addressing the difficulty in the manipulation of the lens using a gripping device due to the small size of the lens or roughness in the cutting of the side of the lens. The adjustment of the positions of the supporting member and the auxiliary member in coordination allows the adjustment of the position of the lens in three dimensions, thus realizing precise coupling or collimating. The ease to control the thickness of the glue layer in each connecting area within a small range prevents the deviation in position of the lens caused by temperature changes or humidity absorption when the glue layer is too thick.

The series of detailed descriptions above is only intended to provide specific descriptions of feasible embodiments of the present disclosure. They are not to be construed as limiting the scope of protection for the present disclosure. All equivalent embodiments or changes that are not detached from the techniques of the present disclosure in essence should fall under the scope of protection of the present claims.

What is claimed is:

1. An optical assembly, comprising:
a base plate;
a light transmitting component arranged on the base plate;
a lens component arranged on the base plate along an optical path of light transmitted from the light transmitting component;
a supporting member; and
an auxiliary member,
wherein the lens component and the auxiliary member are formed as a one-piece structure,
the supporting member comprises a bottom surface that bonds to the base plate,
the auxiliary member comprises a bonding surface that bonds to a side surface of the supporting member,
the lens component is configured to focus and couple, or collimate, an optical signal transmitted from the light transmitting component, and
a bottom surface of the auxiliary member and a bottom surface of the lens component are both higher than a top surface of the base plate,
the light transmitting component is a semiconductor laser,
the optical assembly further comprises an optical waveguide, an optical integrated chip, or an optical fiber, and
an optical signal transmitted from the semiconductor laser passes through the lens component before entering into the optical waveguide, optical integrated chip, or optical fiber.

2. The optical assembly of claim 1, wherein glue is used to bond the bottom surface of the supporting member to the base plate and to bond the side surface of the supporting member and the bonding surface of the auxiliary member, both of a glue layer between the bottom surface of the supporting member and the base plate and a glue layer between the side surface and the bonding surface of the auxiliary member being less than or equal to 15 micrometers in thickness.

3. The optical assembly of claim 1, wherein the supporting member further comprises a light passing surface or a light passing hole on the optical path, the lens component being located between the light transmitting component and the supporting member, or, the supporting member being located between the light transmitting component and the lens component.

4. The optical assembly of claim 3, further comprising: one of an optical isolator, a polarization component, a spectroscopic component, a wave plate, or an optical filter arranged on the light passing surface or the light passing hole of the supporting member.

5. The optical assembly of claim 1, wherein the supporting member is located to the side of the auxiliary member and the lens component.

6. The optical assembly of claim 1, further comprising:
an optical component secured onto the base plate, the optical component being located on the optical path between the light transmitting component and the lens component, or the lens component being located on the optical path between the light transmitting component and the optical component,
wherein the supporting member is glued on the optical component, the supporting member being installed on the base plate by means of the optical component, and
the optical component comprises at least one of an optical isolator, a polarization component, a spectroscopic component, a wave plate, or an optical filter.

7. The optical assembly of claim 6, wherein glue is used to bond the supporting member to the optical component and to the bonding surface of the auxiliary member, both of a glue layer between the supporting member and the optical component and a glue layer between the supporting member and the bonding surface of the auxiliary member both being less than or equal to 15 micrometers in thickness.

8. An optical assembly, comprising:
a base plate;
a light transmitting component arranged on the base plate;
a lens component arranged on the base plate along an optical path of light transmitted from the light transmitting component;
a supporting member; and
an auxiliary member,
wherein the lens component and the auxiliary member are formed as a one-piece structure,
the supporting member comprises a bottom surface that bonds to the base plate,
the auxiliary member comprises a bonding surface that bonds to a side surface of the supporting member,
the lens component is configured to focus and couple, or collimate, an optical signal transmitted from the light transmitting component, and
a bottom surface of the auxiliary member and a bottom surface of the lens component are both higher than a top surface of the base plate,
the light transmitting component is an optical waveguide or an optical fiber,
the optical assembly further comprises a light receiving component, and
an optical signal transmitted from the optical waveguide or optical fiber passes through the lens component before being received by the light receiving component.

9. The optical assembly of claim 8, further comprising, on the optical path between the lens component and the light receiving component, at least one of a wavelength division demultiplexer, a beam shaping component, or an optical path adjustment component.

10. The optical assembly of claim 1, further comprising, on the optical path between the lens component and the optical waveguide or optical fiber, at least one of a wavelength division multiplexer, a beam shaping component, or an optical path adjustment component.

11. An optical assembly, comprising:
a base plate;
a light transmitting component arranged on the base plate;
a lens component arranged on the base plate along an optical path of light transmitted from the light transmitting component;
a supporting member; and
an auxiliary member,
wherein the lens component and the auxiliary member are formed as a one-piece structure,
the supporting member comprises a bottom surface that bonds to the base plate,
the auxiliary member comprises a bonding surface that bonds to a side surface of the supporting member, and
a bottom surface of the auxiliary member and a bottom surface of the lens component are both higher than a top surface of the base plate,
wherein the light transmitting component is a semiconductor laser,
the optical assembly further comprises an optical waveguide, an optical integrated chip, or an optical fiber, and
an optical signal transmitted from the semiconductor laser passes through the lens component before entering into the optical waveguide, optical integrated chip, or optical fiber.

12. The optical assembly of claim 11, wherein the supporting member is located outside of the optical path.

13. The optical assembly of claim 12, wherein the auxiliary member's bonding surface that bonds to the supporting member is located on a side surface of the auxiliary member that is parallel to and farther away from the optical path.

* * * * *